No. 780,522. PATENTED JAN. 24, 1905.
F. R. PACKHAM.
BEARING FOR DISK FURROW OPENERS.
APPLICATION FILED APR. 11, 1904.
2 SHEETS—SHEET 1.
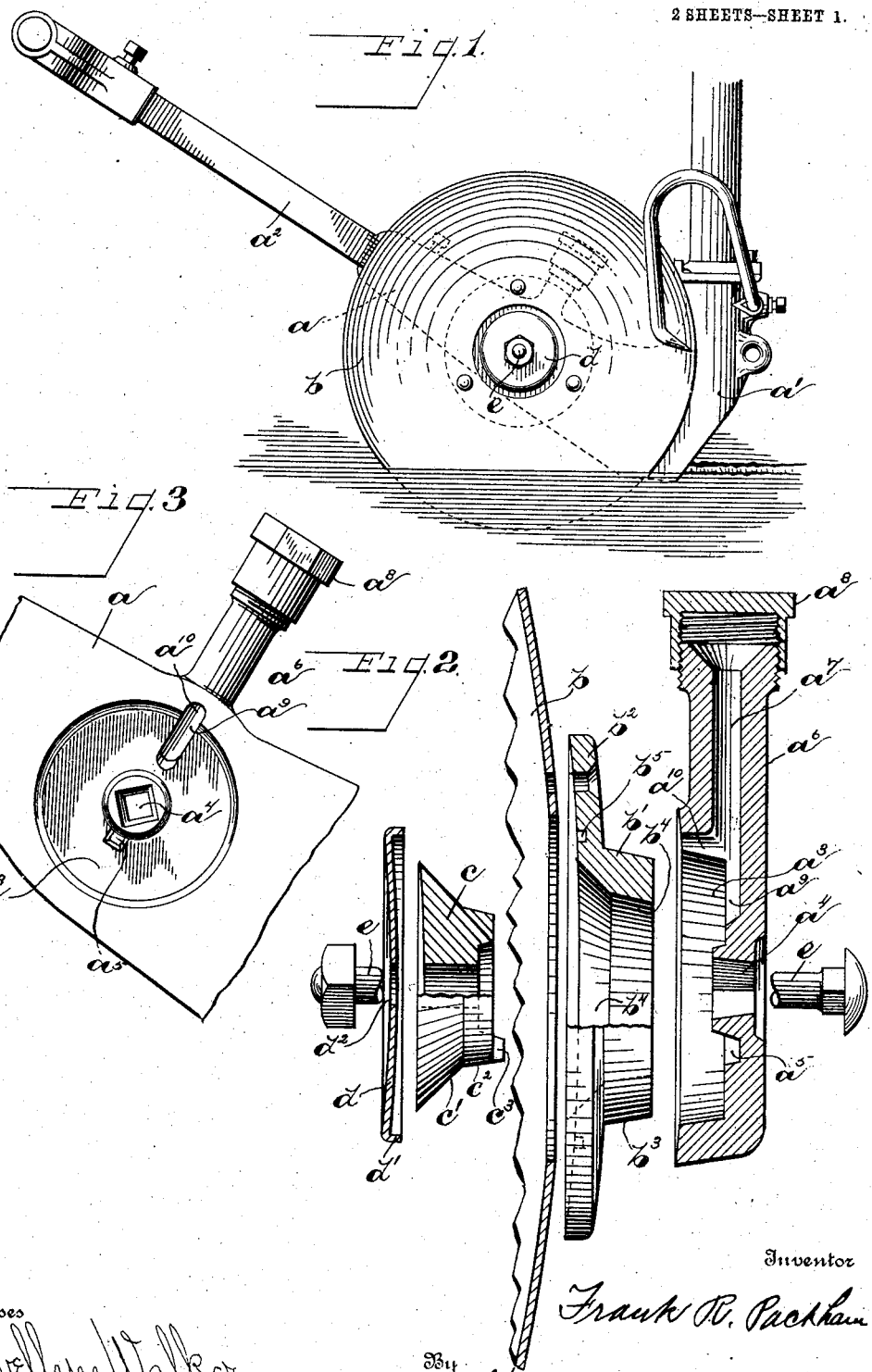

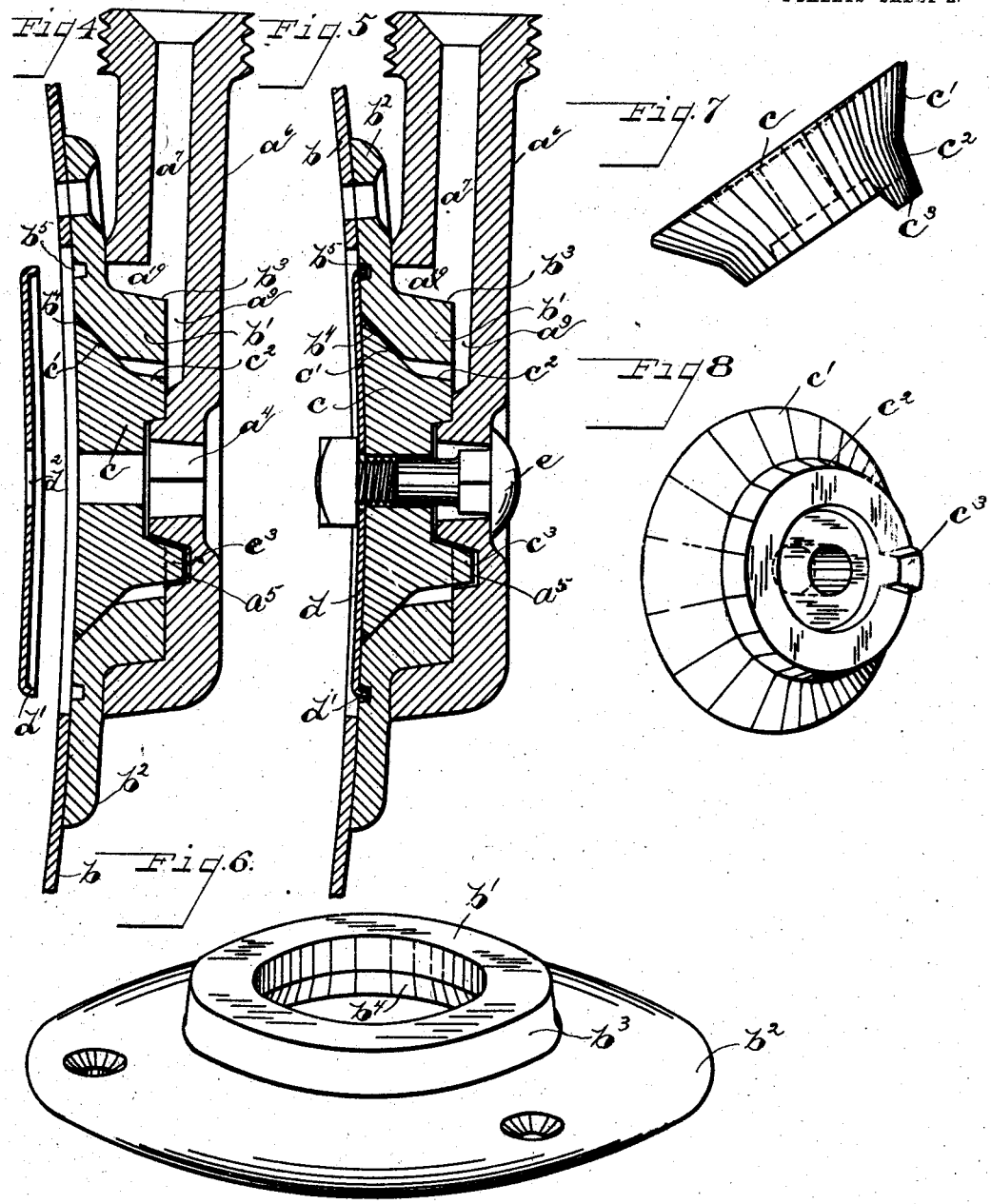

No. 780,522. Patented January 24, 1905.

UNITED STATES PATENT OFFICE.

FRANK R. PACKHAM, OF SPRINGFIELD, OHIO, ASSIGNOR TO AMERICAN SEEDING MACHINE COMPANY, OF JERSEY CITY, NEW JERSEY, A CORPORATION OF NEW JERSEY.

BEARING FOR DISK FURROW-OPENERS.

SPECIFICATION forming part of Letters Patent No. 780,522, dated January 24, 1905.

Application filed April 11, 1904. Serial No. 202,624.

*To all whom it may concern:*

Be it known that I, FRANK R. PACKHAM, a citizen of the United States, residing at Springfield, in the county of Clark and State of Ohio, have invented certain new and useful Improvements in Bearings for Disk Furrow-Openers, of which the following is a specification.

My invention relates to improvements in disk furrow-openers for seeding-machines.

One of the objects of my invention is to provide an improved form of bearing which will present a minimum width in the direction of travel, thereby more freely liberating dirt or trash which is liable to accumulate when furrow-openers with narrow spacings are used, especially in wet or sticky soil.

A further object of my invention is to provide a bearing for disk furrow-openers that shall be practically dust and dirt proof and easily and adequately lubricated.

The objects of my invention are accomplished by the constructions and combinations of parts hereinafter described, and shown in the accompanying drawings.

Figure 1 is a side elevation of the device embodying my invention, shown on the concave side of the disk. Fig. 2 is a sectional view of the same, taken through the disk-bearing and the lubricating-chamber, the parts being shown detached and some of the parts being broken away. Fig. 3 is a detail view of the frame or disk-support, showing the recessed bearing. Figs. 4 and 5 are sectional views of the frame and disk with the parts more or less completely assembled. Fig. 6 is a view in detail of the disk-hub, and Figs. 7 and 8 are detail views of the auxiliary bearing which fits into said disk-hub.

Like parts are represented by similar characters of reference in the several views.

In the drawings, $a$ represents a frame or support, which is preferably arranged to carry the grain-conduit $a'$ and is attached to the usual drag-bar $a^2$, by which it may be secured to the main frame of the seeding-machine. This frame $a$ is provided with a recessed bearing $a^3$, which extends only partly through the frame, there being no opening through the back, except an opening $a^4$ for a fastening-bolt, which opening is closed when the parts are in position.

The furrow-opening disk $b$, formed of steel in the usual manner, is secured to a flanged hub $b'$, preferably by rivets, which are passed through the flange $b^2$ and the steel portion of the disk. This hub $b'$ is provided with an outer tapered bearing $b^3$ and an inner tapered bearing $b^4$. The outer tapered bearing fits in the recessed bearing $a^3$ of the frame $a$, which is made to fit the outer bearing $b^3$ of the hub. After the hub is inserted in the bearing $a^3$ there is inserted into the inner bearing $b^4$ of said hub an auxiliary bearing-piece $c$, having a tapered flange $c'$ to fit the tapered inner bearing $b^4$ of the flanged hub, and it has also an extended portion $c^2$, adapted to extend entirely through the flanged hub and rest against the back of the recessed bearing $a^3$, this extended portion $c^2$ being of smaller diameter than the inner bore of the hub, so as to leave a chamber into which the lubricant may be forced and to bring the bearing proper on the tapered surfaces of the hub and auxiliary bearing, respectively. This auxiliary bearing-piece is further provided with a projecting lug $c^3$, adapted to fit into a depression $a^5$ in the frame to prevent said auxiliary bearing from turning. The flanged hub is provided with a concentric groove $b^5$ on the outer or working face, and there is adapted to fit into this groove an annular flanged cap $d$, preferably formed of thin metal, with a peripheral flange $d'$, to fit into said groove and a central opening $d^2$ to receive the fastening-bolt $e$, which fastening-bolt is adapted to hold all the parts together.

The frame $a$ is preferably provided with an extended portion $a^6$, in which is formed a lubricating-channel $a^7$, the top of which has a screw-threaded compressing-cap $a^8$, forming a chamber in which the lubricant is placed. This lubricating-chamber $a^7$ is extended down along the back of the depressed bearing $a^3$, forming a channel $a^9$, which communicates with the chamber between the extended portion $c^2$ of the auxiliary bearing-piece and the inner bore of the hub $b'$. It is also preferably provided with a branched groove $a^{10}$, which extends outwardly and communicates with the outer surface of said frame at the point where the flanged hub $b'$ contacts with said frame.

The auxiliary bearing $c$, it will be understood, is of such length that the parts may be drawn up tight and this auxiliary bearing clamped to the frame without clamping the disk-hub, thus completely closing the bolt-chamber from the bearing.

The assembling of the parts will be understood from the above description and from the drawings, Figs. 2, 4, and 5. It will be seen that when assembled the disk has both an outer and an inner bearing, that it is of minimum width in the direction of travel, that the frame having the depressed bearing has no opening in the rear which communicates with the bearing, and that the bearing is practically incased against the entrance of foreign substances, that the lubricant may be forced directly into the wearing-surfaces, and that the whole construction furnishes a disk furrow-opener which is particularly desirable for use with seeding-machines having narrow spacings and is designed with special reference to the conditions existing at seeding time in sections where it is customary to plant grain in the spring of the year or at a time when the seed-bed is in a moist condition.

Having thus described my invention, I claim—

1. The frame having the recessed bearing opening only at one side, in connection with the flanged disk-bearing adapted to fit into same, and a flanged cap fitting into an annular groove in said disk-bearing, and a clamping-bolt for holding the parts together, substantially as specified.

2. The combination with the disk having a central hub, of a frame having a recessed bearing, an auxiliary bearing having a tapered head fitted into said hub and engaging said frame, and a clamping-bolt, substantially as and for the purpose specified.

3. The combination of the frame having a recessed bearing, a disk having a flanged hub to fit into said bearing, an auxiliary bearing-piece having a tapered flange to fit into said hub, and a flanged cap extending over said auxiliary bearing-piece and engaging in an annular groove in said hub, and means for clamping the parts together, substantially as specified.

4. The combination with the rotating disk having the flanged hub, of a frame having a recessed bearing, an oil-chamber in said frame, an auxiliary bearing-piece to fit in said hub having a tapered bearing-flange, said bearing being reduced beyond said flange to form with said hub a lubricant-receiving chamber, substantially as specified.

5. The combination with the rotating disk having the tapered hub, a frame having a recessed tapered bearing, an auxiliary bearing-piece having a tapered flange to fit in said hub and engaging parts between said bearing-piece and frame, a flanged cap fitting over said bearing-piece, an annular groove in said disk to be engaged by said cap, and a clamping-bolt extending through said frame, cap and auxiliary bearing-piece, substantially as specified.

In testimony whereof I have hereunto set my hand this 8th day of April, A. D. 1904.

FRANK R. PACKHAM.

Witnesses:
 FRED. B. ERNEST,
 CHAS. I. WELCH.